(12) United States Patent
Dehmas

(10) Patent No.: US 9,998,159 B2
(45) Date of Patent: Jun. 12, 2018

(54) RF RECEIVER WITH FREQUENCY TRACKING

(71) Applicant: COMMISSARIAT A L'ENERGIE ATOMIQUE ET AUX ENERGIES ALTERNATIVES, Paris (FR)

(72) Inventor: Francois Dehmas, Vif (FR)

(73) Assignee: COMMISSARIAT A L'ENERGIE ATOMIQUE ET AUX ENERGIES ALTERNATIVEs, Paris (FR)

(*) Notice: Subject to any disclaimer, the term of this patent is extended or adjusted under 35 U.S.C. 154(b) by 0 days. days.

(21) Appl. No.: 15/399,472

(22) Filed: Jan. 5, 2017

(65) Prior Publication Data

US 2017/0201278 A1 Jul. 13, 2017

(30) Foreign Application Priority Data

Jan. 7, 2016 (FR) ...................................... 16 50117

(51) Int. Cl.
*H04B 1/10* (2006.01)
*H04L 27/22* (2006.01)
(Continued)

(52) U.S. Cl.
CPC ......... *H04B 1/1036* (2013.01); *G06F 7/4818* (2013.01); *H04B 1/0007* (2013.01); *H04L 7/0087* (2013.01); *H04L 27/22* (2013.01); *H04L 27/38* (2013.01); *H04L 7/0054* (2013.01); *H04L 25/0202* (2013.01); *H04L 27/0014* (2013.01); *H04L 27/2273* (2013.01);
(Continued)

(58) Field of Classification Search
CPC ....... H04L 2027/0057; H04L 2027/003; H04L 27/152; H04L 27/2273; H04L 27/2332; H04L 27/3827; H04L 7/0054; H04L 2027/0055; H04L 2027/0065; H04L 25/0202; H04L 27/0014; H04L 27/266; H04L 27/2679

See application file for complete search history.

(56) References Cited

U.S. PATENT DOCUMENTS

| | | | |
|---|---|---|---|
| 6,771,515 B2 | 8/2004 | Rives et al. | |
| 6,771,715 B1* | 8/2004 | Rives | H04L 27/2332 375/327 |
| 2008/0112509 A1* | 5/2008 | Bock | H04L 7/0054 375/320 |

FOREIGN PATENT DOCUMENTS

FR        2 977 943        1/2013

OTHER PUBLICATIONS

French Preliminary Search Report dated Sep. 9, 2016 in French Application 16 50117 filed on Jan. 7, 2016 (with English Translation of Categories Cited).

(Continued)

*Primary Examiner* — Janice Tieu
(74) *Attorney, Agent, or Firm* — Oblon, McClelland, Maier & Neustadt, L.L.P.

(57) ABSTRACT

A robust frequency drift tracking receiver. The received signal is translated to an intermediate frequency in the RF stage by a quadrature demodulator, and is then brought into the base band by a digital mixer made by a CORDIC. A base band processing stage allows for a synchronization of the receiver relative to the data frame, to estimate data and to output a counter-reaction signal to the CORDIC, obtained by integration of successive frequency corrections, with a predetermined step.

15 Claims, 6 Drawing Sheets

(51) Int. Cl.
*G06F 7/48* (2006.01)
*H04B 1/00* (2006.01)
*H04L 27/00* (2006.01)
*H04L 27/38* (2006.01)
*H04L 27/227* (2006.01)
*H04L 27/233* (2006.01)
*H04L 27/26* (2006.01)
*H04L 25/02* (2006.01)
*H04L 7/00* (2006.01)

(52) U.S. Cl.
CPC ........ *H04L 27/2332* (2013.01); *H04L 27/266* (2013.01); *H04L 27/2679* (2013.01); *H04L 27/3827* (2013.01); *H04L 2027/003* (2013.01); *H04L 2027/0055* (2013.01); *H04L 2027/0057* (2013.01); *H04L 2027/0065* (2013.01)

(56) References Cited

OTHER PUBLICATIONS

Seunghyeon Nahm et al. "A Cordic-Based Digital Quadrature Mixer: Comparison With a Rom-Based Architecture", Proceedings of the 1998 IEEE International Symposium on Circuits and Systems, vol. 4, May 31, 1998, pp. 4.

Xu Li et al. "CORDIC based algorithm for frequency offset estimation," Communication Technology (ICCT), 2010 12$^{th}$ IEEE International Conference on, IEEE, Nov. 11, 2010, pp. 4.

Milos Krstic et al. "Optimized Low-Power Synchronizer Design for the IEEE 802.11a Standard" Proceedings of International Conference on Acoustics Speech and Signal Processing, vol. 2, Apr. 6, 2003, pp. 4.

Francis D. Natali, "AFC Tracking Algorithms," IEEE Transactions on Communications, vol. Com-32, No. 8, Aug. 1984, pp. 13.

* cited by examiner

RF RECEIVER WITH FREQUENCY TRACKING

TECHNICAL DOMAIN

This invention relates to the domain of RF receivers and more particularly receivers for use in narrow band very long range and very low throughput telecommunication systems such as those envisaged for the IoT (Internet of Things).

STATE OF PRIOR ART

In general, an RF receiver requires frequency tracking of the signal transmitted by the transmitter. Central transmission and reception frequencies are never perfectly equal due to the imprecision of oscillators and their temperature drift. Furthermore, the relative displacement velocity of the receiver relative to the transmitter generates, a Doppler effect and therefore a frequency drift that has to be compensated.

Different solutions have been put forward in prior art to estimate the CFO (Carrier Frequency Offset) between the transmitter and receiver to compensate for it in the reception. In particular, it is known that a frequency tracking loop can be set up at the output from the quadrature demodulation stage to control the frequency of VCO oscillators (Voltage Controlled Oscillators) in this stage. Thus, the received signal is continuously returned into the base band or to a fixed intermediate frequency. Different types of frequency tracking loops are described for example in the article by F. D. Natali entitled "AFC tracking algorithms" published in IEEE Trans. on Comm., Vol. COM-32, No. 8, August 1984.

More recently, application FR-A-2977943 disclosed a narrow band and low throughout transmission system in which a blind estimate of the frequency offset is made from the RF signal itself after it has been converted to digital, and this frequency offset can be compensated on samples of this signal.

However this frequency tracking loop requires relatively complex calculations, which requires a large silicon surface area and leads to high consumption that is not easily compatible with the power level available in a connected object.

Consequently, the purpose of this invention is to disclose an RF receiver with a particularly simple and robust frequency tracking loop, suitable for low throughput transmission on a narrow band.

PRESENTATION OF THE INVENTION

This invention is defined by a frequency drift tracking receiver designed to receive packets of symbols modulating an RF signal, said receiver comprising an RF stage to translate the RF signal received at an intermediate frequency by means of a quadrature mixer and to digitise the signal thus obtained, the receiver also comprising:

a digital mixer using a CORDIC to bring the frequency translated signal thus digitised into the base band, the CORDIC rotating the phase of each sample as a function of an estimate of the intermediate frequency;

a base band digital processing module designed to be synchronised with packets of symbols and to estimate data transmitted in said packets, and to determine the sign of the variation in the frequency drift for each symbol from the data thus estimated, the intermediate frequency being estimated by integration of corrections of elementary frequency steps by a predetermined value modified by the signs thus determined.

Advantageously, the base band digital processing module comprises at least three filters adapted to the shape of the pulse that was used to modulate the RF signal, a first matched filter being centred on the zero frequency, a second matched filter being offset relative to the first matched filter by a positive predetermined frequency difference and the third matched filter being offset relative to the first matched filter by a negative predetermined frequency difference, the output signals from the three matched filters being input firstly to a switch and to a synchronisation module controlling said switch to select a matched filter output signal.

Preferably, each symbol packet comprises a synchronisation preamble, a predetermined frame delimiter and a data frame, the synchronisation module searches for a frame delimiter in the output signals and selects the output signal in which the frame delimiter was found.

If the synchronisation module detects a frame delimiter in several output signals, it selects the highest power output signal amongst these output signals.

The selected output signal can then be resampled by a decimator controlled by the synchronisation module, the decimator providing samples at the symbol frequency.

Advantageously, the synchronisation module determines the highest amplitude sample in at least one sequence of samples corresponding to a pulse, and controls the decimator so as to select this sample for each symbol.

If data were modulated by means of a DBPSK modulation, each sample at the decimator output is multiplied with the conjugate of the previous sample by means of a DBPSK demodulator to provide the symbols of a BPSK modulation constellation.

BPSK symbols at the output from the demodulator can be multiplied in an angular correction module by the conjugate of a magnitude characteristic of a rotation of the BPSK modulation constellation to output corrected symbols.

In this case, an estimator can then make a hard estimate on the corrected symbols to estimate the data.

The estimator can advantageously estimate data by determining the sign of the real part of the corrected symbols.

The angular rotation estimating module advantageously multiplies BPSK symbols at the output from the DBPSK demodulator with symbols characteristic of estimated data to supply a magnitude characteristic of the rotation of the BPSK constellation between two consecutive symbols.

The frequency drift tracking receiver can also comprise a module determining the direction of variation of the frequency drift starting from the sign of the imaginary part of said characteristic magnitude.

If required, the characteristic magnitude can be filtered by a law pass filter before being input to said angular correction module.

The frequency drift tracking receiver can also comprise a second switch connected to the synchronisation module and to the angular rotation estimating module that will output symbols forming the frame delimiter during a synchronisation phase and said filtered characteristic magnitude during reception of the data frame, to the angular correction module.

The frequency pitch can advantageously be chosen to be less than $\frac{1}{16}T$ in which T is the symbol period.

BRIEF DESCRIPTION OF THE DRAWINGS

Other characteristics and advantages of the invention will become clear after reading a preferred embodiment of the invention with reference to the attached figures among which.

DETAILED PRESENTATION OF PARTICULAR EMBODIMENTS

Figure 1:
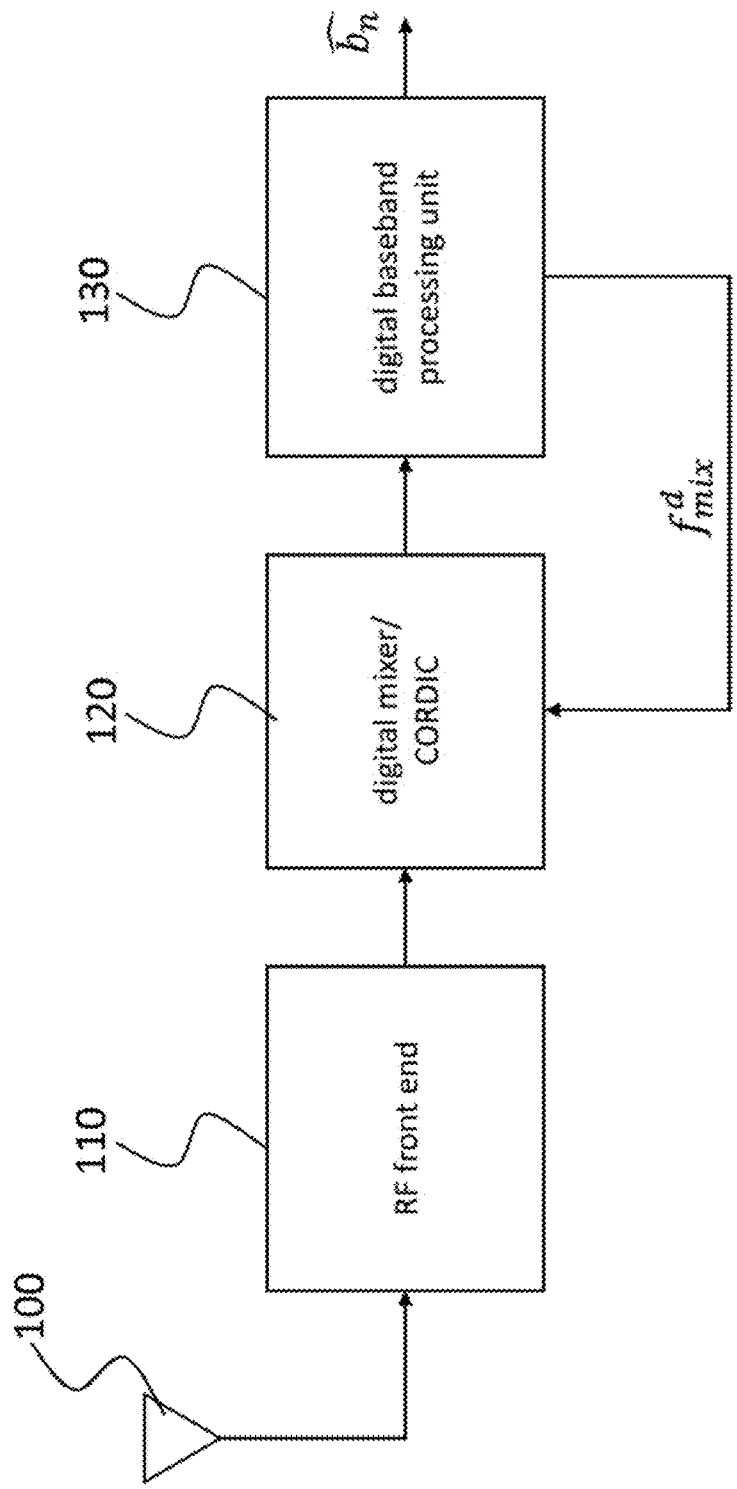
FIG. 1 diagrammatically represents the architecture of an RF receiver according to one embodiment of the invention.

We will consider a receiver with the general architecture shown in FIG. 1 for the remainder of this description.

The receiver comprises an RF stage 110, connected to the antenna 100, with the function of bringing the RF signal to a floating intermediate frequency, $f_i^a$, and to sample it, a digital mixer 120, with the function of bringing the signal into the base band, and a base band digital processing module 130 that will be described in detail later.

The digital mixer 120 is made from a CORDIC (COordinate Rotation Digital Computer) that does a phase rotation at every instant to bring the intermediate frequency signal $f_i^a$ into the base band. More precisely, if the sampling period is denoted $T_e$ and the sampling index is denoted k, the phase rotation made at instant $kT_e$ is:

$$\Delta\varphi = -2\pi f_{mix}^d \cdot kT_e \text{ modulo } 2\pi \quad (1)$$

in which, $f_{mix}^d = \hat{f}_i^a$ is a frequency value received by the CORDIC corresponding to an estimate of $f_i^a$.

The CORDIC achieves this phase rotation by elementary rotations of values $\Delta\varphi$ +dφ or −dφ (dφ being positive) depending on the sign of the phase rotation. The elementary phase increment dφ is chosen such that $\tan(d\varphi)=2^{-p}$ where p varies from 0 to N in which N is chosen to be sufficiently large depending on the required degree of precision. More precisely, in iteration p, the CORDIC receives an input vector $v_p$ and calculates an output vector $v_{p+1}$ for each elementary rotation such that:

$$v_{p+1} = R_{\epsilon\delta\varphi} v_p \quad (2)$$

where $R_{\epsilon\delta\varphi}$ is the rotation matrix of ε·dφ defined by:

$$R_{\epsilon\delta\varphi} = \begin{pmatrix} 1 & -\varepsilon.2^{-p} \\ \varepsilon.2^{-p} & 1 \end{pmatrix} \quad (3)$$

It will be understood that the elementary rotation operation is particularly easy because it is reduced to simple offsets and additions/subtractions.

Figure 2:
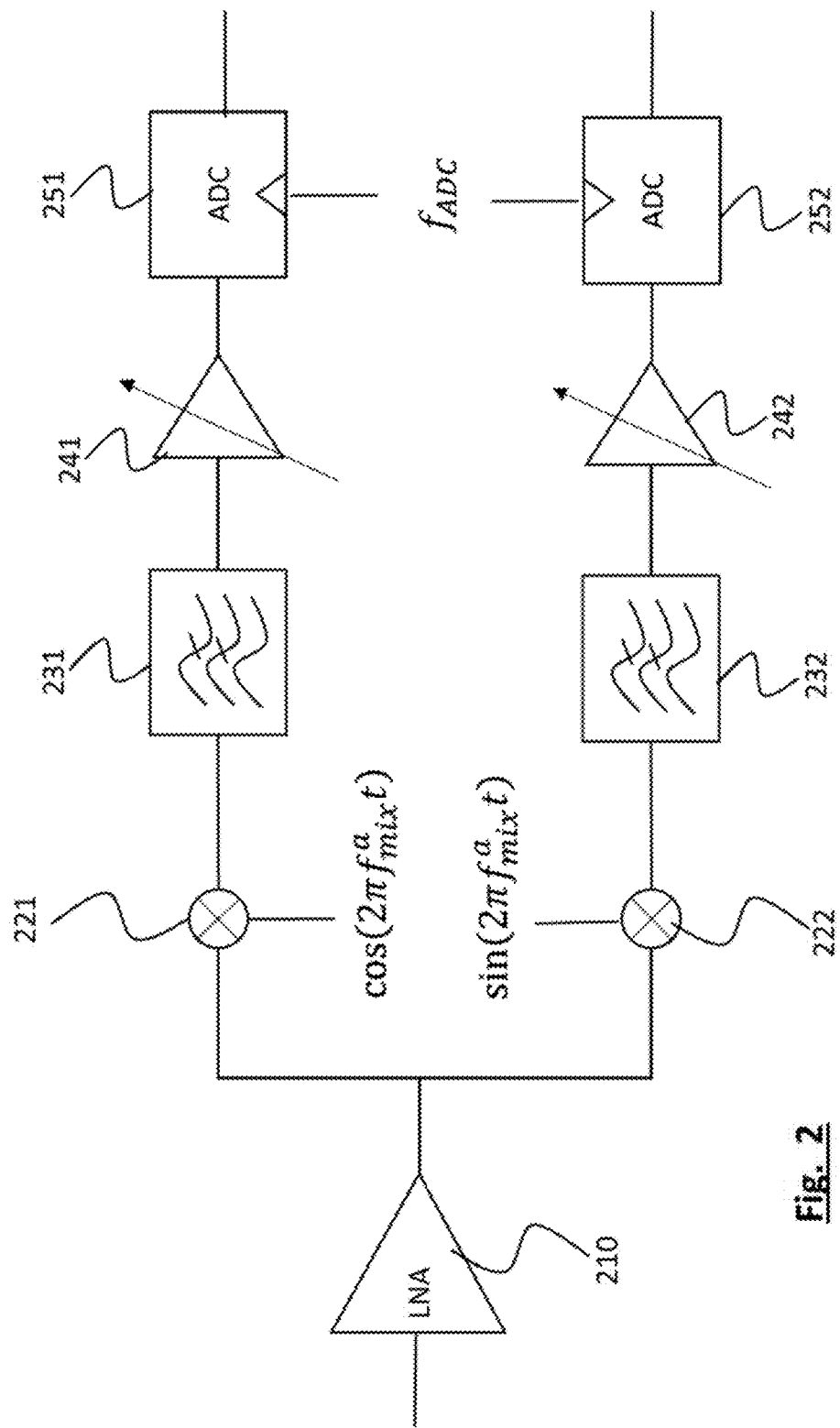
FIG. 2 diagrammatically represents the RF stage of the receiver in FIG. 1.

FIG. 2 diagrammatically represents the RF stage of FIG. 1;

This includes a loan noise amplifier LNA, 210, a quadrature mixer (mixers 221,222), translating the signal central frequency, $f_0$, to an intermediate frequency $f_i^a = f_0 - f_{mix}^a$ in which $f_{mix}^a$ is the frequency of the oscillator outputting sine curves in quadrature to mixers 221, 222. It is important to note that in this case the first intermediate frequency $f_i^a$ is not a fixed frequency but that it varies as a function of the chosen central frequency, the drift of the central frequency chosen for the transmission and the drift of the oscillator.

Signals in quadrature at the output from the mixer are then filtered by means of low pass filters 231, 232 before being amplified, and are then converted using, analogue-digital converters 251 and 252. If applicable, the signals in quadrature can then be passed through a low pass filter step in digital and then a first decimation step (not shown).

Figure 3:
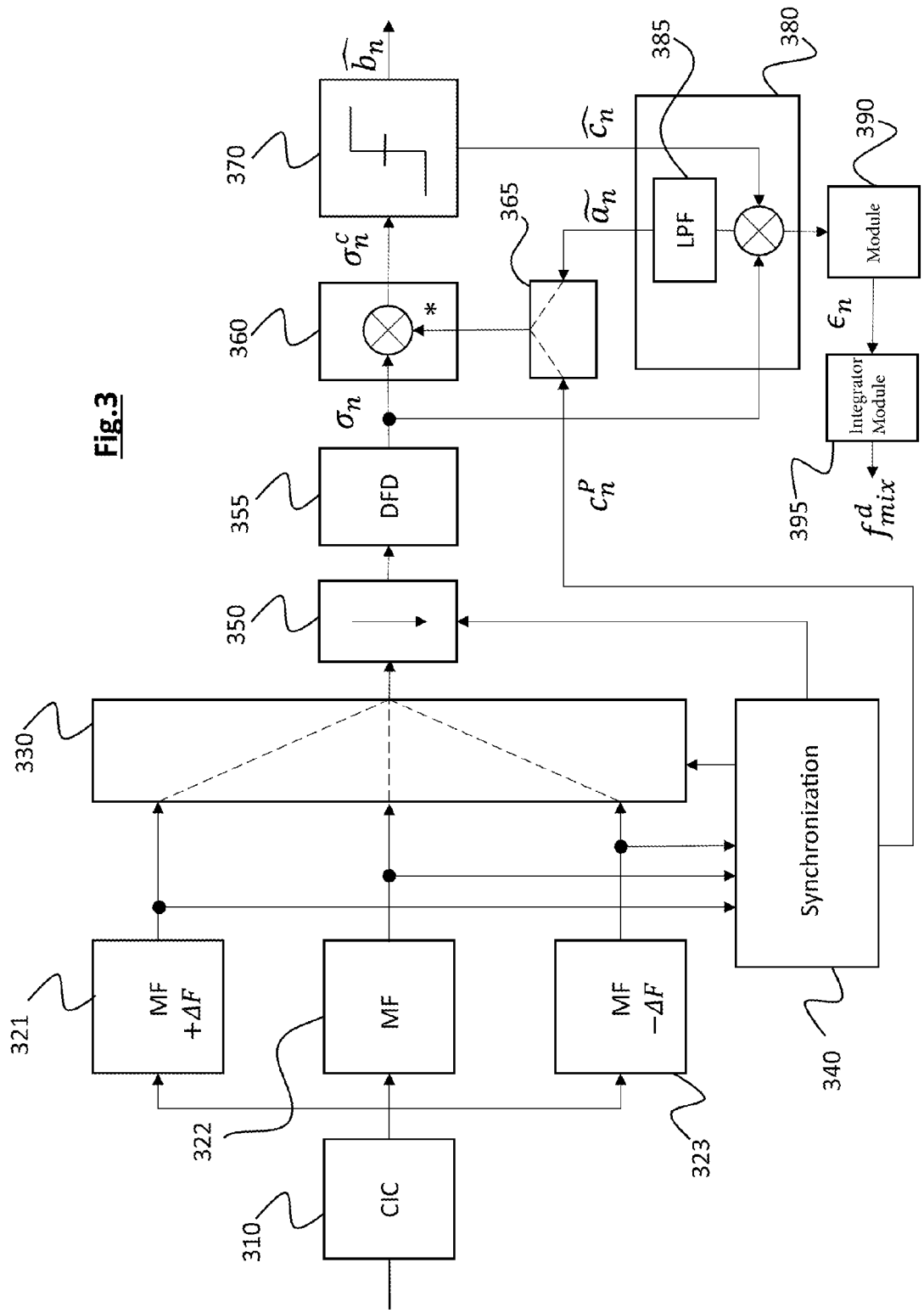
FIG. 3 diagrammatically represents the base band digital processing stage of the receiver in FIG. 1.

In any case, the pairs of samples in quadrature, after being filtered and decimated when applicable, are input to the digital mixer 120 of FIG. 1 in the form of a vector. Components in quadrature of the rotated vector are then transmitted to the digital processing stage in base band shown in FIG. 3.

For reasons of convenience, connections between the modules of this figure are indicated by simple arrows. However it will be understood that the processed samples are complex samples are consequently comprise a real part and an imaginary part.

The base band digital processing stage comprises an optional filtration/decimation stage 310, for example made in the form of a CIC (Cascaded Integrator Comb) filter. This CIC filter can eliminate any interferers and reduce the sampling rate.

The baseband digital signal is then filtered by three matched filters 321, 322, 323 arranged in parallel. Filter 322 is a filter matched to the shape of the transmitted filters, centred on the null frequency. Filters 321 and 323 are versions of the same matched filter, each shifted by a frequency offset +ΔF, −ΔF from the null frequency. In general, it would be possible to allow for a plurality of matched filters with the same transfer function except, for a frequency offset, one of them being centred on the null frequency and the others being centred symmetrically about this frequency.

The matched filters are active simultaneously in a first phase called the synchronisation phase that will be described in detail later. At the end of this synchronisation phase, the matched filter that is best centred on the base band signal will be selected. This matched filter then remains active throughout the remainder of the packet, the other matched filters being deactivated or their outputs being inhibited.

In this case, output signals from the three matched filters 321-323 are input firstly to the switch 330 and secondly to the synchronisation module 340.

The synchronisation module 340 determines the matched filter for which the output signal has the highest power during the synchronisation period, for example by comparing the energy of the different output signals during the duration of the synchronisation period. The synchronisation module 340 also uses the output signals to determine the beginning of the data frame and selects the matched filter accordingly. Finally, the synchronisation module 340 determines symbol sampling instants, each symbol giving rise to a plurality of samples at the output from the matched filters.

Figure 4:
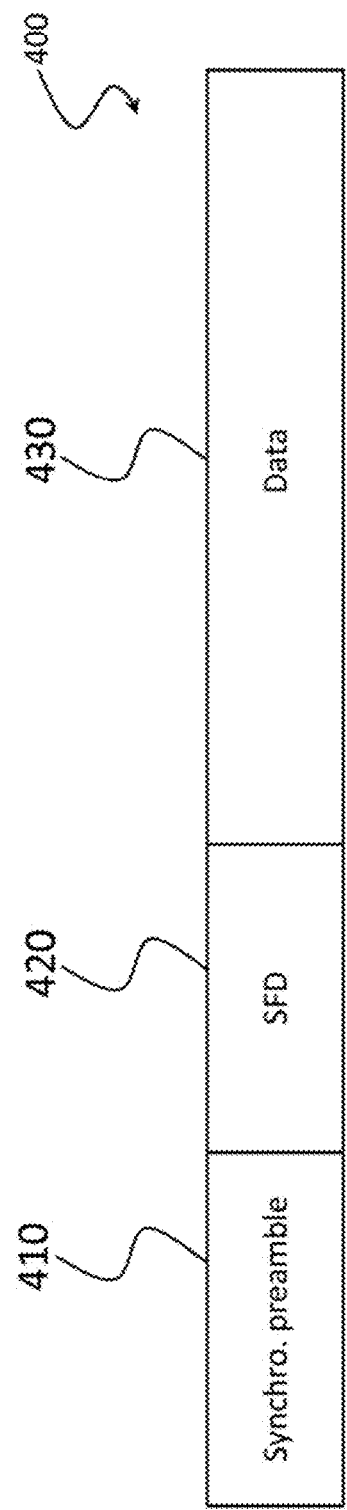
FIG. 4 represents the format of a transmission packet.

More precisely, FIG. 4 shows a transmission packet 400. This packet comprises a synchronisation preamble, 410, a Start of Frame Delimiter (SFD) 420 and a data frame, 430. The synchronisation module determines the highest power output signal from the matched filters 321-323 during the synchronisation preamble (for example a sequence of alternating bits). Knowing the sequence of symbols making up the SFD delimiter, the synchronisation module attempts to identify the start of the data frame in each output signal (for example using a correlation or a simple comparison).

The synchronisation module then selects the matched filter for which the output signal was used to identify the SFD delimiter. If the synchronisation module identifies the SFD delimiter in several output signals, the synchronisation module determines the one with the highest power and selects the matched filter accordingly, using the switch 330.

Packet data are in the form of DBPSK (Differential Binary Phase Shift Keying) symbols or possibly BPSK (Binary Phase Shift Keying) symbols, each symbol modulating a pulse filtered by a Pulse Shaping Filter (PSF).

At the receiver end, at the output from the selected matched filter, each symbol gives rise to a plurality K of successive samples in which K is the ratio between the sample rate at the output from module 310 and the symbol rate, namely $$K = \frac{T}{T_\varepsilon}.$$

The synchronisation module 340 determines the optimum sampling instant among the plurality of successive instants (that with the highest amplitude).

Signal samples at the output from the selected matched filter are resampled by the decimator 350. To achieve this, the synchronisation module 340 supplies the optimum instant to a decimator 350, with decimation factor K. Consequently, output signals from the decimator 350 are at the symbol rate.

The modulation used by the transmitter may be a BPSK modulation, or preferably a DBPSK modulation.

When the transmitter uses a differential modulation (DBPSK), the samples output from the decimator 350 are firstly subjected to a differential demodulation at 355. This is done in a manner known in itself by calculating the Hermitian product of the current sample and the previous sample. Obviously, the differential demodulator 355 is not present in the case of a BPSK type direct modulation.

Output samples from the decimator 350, possibly after differential demodulation 355, are BPSK signals. An angular correction is made on them at 360, to compensate for the rotation of the modulation constellation as described below. The symbols are then estimated by making a hard decision using the estimator 370, from the samples thus corrected.

The module 380 estimates a magnitude characteristic of the angular rotation of the modulation constellation starting from estimated symbols and output samples from the decimator 350. This characteristic magnitude is filtered by means of a low pass filter (LPF) before being input to the angular correction module 360.

Said characteristic magnitude is also input to the module 390 that deduces the direction of variation of the frequency drift, $\epsilon_n$, between two consecutive symbols.

The integrator module 395 summates successive frequency corrections, the successive corrections being equal to $\epsilon_n \cdot \delta f$ in which $\delta f$ is a predetermined frequency step. This sum of successive corrections is input to the digital mixer 120 as an estimate of the intermediate frequency, $\widehat{f_i^a}$.

Operation of the base band digital processing stage will be described for the case of a DBPSK modulation. The signal transmitted by the emitter can then be expressed in the following form:

$$s_{Ts}(t) = A\cos(2\pi f_0 t + \alpha) \sum_k d_k p_0(t - kT) \qquad (4)$$

in which A is the amplitude, of the transmitted signal, $f_0$ is the central frequency of the signal, $\alpha$ the phase at the origin, $p_0(t)$ the pulse shape (for example in Root Raised Cosine— RRC), T is the symbol period and $d_k$ are the DBPSK symbols. Remember that DBPSK symbols are obtained from data bits $b_k$ using:

$$b_k' = b_k \oplus b_{k-1}'$$

$$d_k = +1 \text{ if } b_k' = 0$$

$$d_k = -1 \text{ if } b_k' = 1 \qquad (5)$$

and conversely:

$$d_k d_{k-1} = +1 \Rightarrow b_k = 0$$

$$d_k d_{k-1} = -1 \Rightarrow b_k = 1 \qquad (5')$$

The shape of the resampled signal at the output from the decimator 350 is then as follows:

$$s_{dbd}(n) = B\exp(i(2\pi(f_0 - f_1)nT + \varphi)) \cdot \sum_k d_n p_1((n-k)T) + N(n) \qquad (6)$$

in which B is the amplitude of the signal at the output from the selected matched filter, $f_1$ is the sum of the frequency of the analogue mixer ($f_{mix}^a$) and the frequency of the digital mixer ($f_{mix}^d$), $\varphi$ is a phase dependent on the phase of the carrier and phases of the mixers, $p_1(t)$ is the self-correlation of the pulse shape $p_0(t)$ (or equivalently, the signal $p_0(t)$ filtered by the matched filter), and $N(n)$ is a noise sample.

After differential demodulation, the samples output from module 355 are expressed in the following form:

$$\sigma_n = s_{dbd}(n) s^\circ{}_{dbd}(n-1) = B^2\exp(i2\pi(f_0-f_1)T)d_n d_{n-1} + \qquad (7)$$

$$B\exp(i2\pi(f_0-f_1)nT + i\varphi)N^\circ(n-1) +$$

$$B\exp(-i2\pi(f_0-f_1)(n-1)T - i\varphi)N(n) + N(n).N^\circ(n-1)$$

If it is assumed that the signal to noise ratio is sufficient, in other words the terms in which the noise appears can be neglected, then:

$$\sigma_n = B^2\exp(i2\pi(f_0-f_1)T)d_n d_{n-1} \qquad (8)$$

When frequency tracking is done by the digital mixer, we obtain:

$$|2\pi(f_0-f_1)T| \ll \pi/2 \qquad (9)$$

If, for the moment, we ignore the angular correction in module 360, the estimator 370 estimates the BPSK values, $c_n$, using the hard decision:

$$\widehat{c_n} = \text{sgn}(Re(\sigma_n)) \qquad (10)$$

the data bits being deduced traditionally $$\widehat{b_n} = \frac{1 - \widehat{c_n}}{2}$$

with the modulation convention defined in (5).

The module 380 estimates the instantaneous angular rotation of the modulation constellation starting from:

$$\widehat{\theta_n} = \arg(\sigma_n \widehat{c_n}) \qquad (11\text{-}1)$$

or more precisely, estimates the corresponding characteristic magnitude:

$$a_n = B^2 e^{i\hat{\theta}_n} = \sigma_n \hat{c}_n \qquad (11\text{-}2)$$

It is important to note that multiplying $\sigma_n$ by the estimated symbols $\hat{c}_n$ make the process independent of the influence of data.

The complex material $a_n$ is advantageously filtered by a low pass filter (LPF), for example a recursive filter with a forgetting factor. The complex magnitude thus filtered $\tilde{a}_n$ is used to compensate for rotation of the constellation in the module 360 by calculating the Hermitian product:

$$\sigma_n^c = \sigma_n \tilde{a}_n^* \qquad (12)$$

Thus when angular compensation is active, the corrected samples, $\sigma_n^c$, in other words samples corrected by the angular correction, are used in the expression (10).

The module 390 determines the direction of variation (or the frequency drift) between consecutive samples:

$$\epsilon_n = \mathrm{sgn}(Im(\sigma_n \hat{c}_n)) \qquad (13)$$

This sign calculation is particularly simple, it makes it possible to robustly monitor the frequency variation. The frequency correction is made in steps of $\delta f$, in which:

$$\delta f = \frac{\delta \varphi}{2\pi} \frac{1}{T} \qquad (14)$$

in which $\delta\varphi$ is a predetermined phase skip.

Preferably, $\delta f < 1/16T$ will be chosen such that the corresponding phase skip, $$|\delta\varphi| \leq \frac{\pi}{8},$$

does not disturb the bit estimate.

The integrator module 395 then calculates the frequency $f_{mix}^d$, sum of the supposed initial frequency $f_{mix}^{d\_init}$ and successive corrections:

$$f_{mix}^d = f_{mix}^{d\_init} + \delta f \sum_n \epsilon_N \qquad (15)$$

This frequency is input to the digital mixer 120 as an estimate of the intermediate frequency, $\hat{f}_i^a$. The digital mixer rotates the phase $\Delta\varphi_{n+1}$ obtained by recurrence:

$$\Delta\varphi_{n+1} = \Delta\varphi_n - 2\pi f_{mix}^d T \qquad (16)$$

Using this frequency tracking, the signal output from the digital mixer at frequency $\Delta f = f_0 - f_1$, where $f_1 = f_{mix}^a + f_{mix}^d$, is kept within the spectral response of the selected matched filter.

The angular rotation of the modulation constellation is compensated firstly during the synchronisation phase and secondly during reception of data.

During the synchronisation phase, the receiver knows the sequence of pilot symbols $c_n^P$ of the preamble. The sequence of output symbols from each matched filter is correlated with the sequence of pilot symbols. Successive correlation peaks can be used to determine decimation instants at the symbol frequency in the decimator 350.

Furthermore, knowledge of pilot symbols can be used to estimate the angular rotation using:

$$a_n^P = \sigma_n (c_n^P)^* \qquad (17)$$

The symbols $c_n^P$ are output directly from the synchronisation 340 to the angular correction module 360. Thus, during the synchronisation phase, retroaction of the output from the estimator 370 to the angular correction module is prevented. During this phase, there is no more retroaction from the integrator module 395 to the CORDIC 120.

The switch 365 changes position between the synchronisation phase and the data reception phase. More precisely, during the synchronisation phase, it transmits values of correlation peaks (possible filtered using a low pass filter) output from the synchronisation module 340 and (during the data reception phase), symbols $\tilde{a}_n$ output from the tow pass filter 385, to the angular correction module 360.

The angular rotation is compensated using the Hermitian product $\sigma_n^c = \sigma_n(a_n^P)^*$ during the synchronisation phase and using the $\sigma_n^c = \sigma_n \tilde{a}_n^*$ product during the data reception phase. This compensation corrects the precise rotation of the constellation due to the offset between the frequency $\Delta f$ and the real frequency difference $\Delta f_{ext}$, represented by the magnitude $a_n^P$ (during the synchronisation phase) and $\tilde{a}_n$ (during the data reception phase).

The receiver disclosed above is designed to receive DBPSK symbols. However, the man skilled in the art will understand that an embodiment in which BPSK symbols are received could be envisaged as an alternative. In this case, as mentioned above, the differential demodulation module 355 is eliminated and the magnitude $a_n$ calculated by the module 380 is obtained by $a_n = \sigma_n \hat{c}_n$, in which $\hat{c}_n$ in this case is the BPSK symbol corresponding to bit $\hat{b}_n$ estimated by the estimator 370 (in other words $\hat{c}_n = +1$ if $\hat{b}_n = 1$ and $\hat{c}_n = -1$ if $\hat{b}_n = 0$). As above, the modulation effect due to data is thus neutralised.

A numeric example is given below illustrating an application of the invention to the domain of the "internet of things". The signal is transmitted in the ISM band at 868 MHz. The central frequency of the signal is around 869.5 MHz in a 48 kHz band. The format of transmission packets is shown in FIG. 4. The throughput is 100 bits/s, in other words T=10 ms and the modulation is a DBPSK modulation. The mix frequency of the analogue mixer is 868.6 MHz and therefore the intermediate frequency if there is no frequency tracking is of the order of 900 000 Hz. Analogue-digital analogue converters 241-242 of the RF stage output samples at a sampling frequency of 13.572 MHz. A first decimation step, is done in the RF stage and a second decimation step is done in the filtering/decimation module 310. At the output, the samples are output at a rate of 600 Hz, namely 6 samples per symbol. In this case, the matched filters are RRC filters. The central filter 322 is centred on 0 Hz, the filter is centred on +50 Hz and the filter 323 is centred on −50 Hz. The decimator 350 resamples with a factor of 6, to return to one sample per symbol. The frequency step $\delta f$ is chosen to the equal to 1 Hz, in other words the frequency cannot, vary by more than ±1 Hz at each symbol.

In the following, it will be assumed that the receiver configuration parameters are the same as above.

Figure 5:
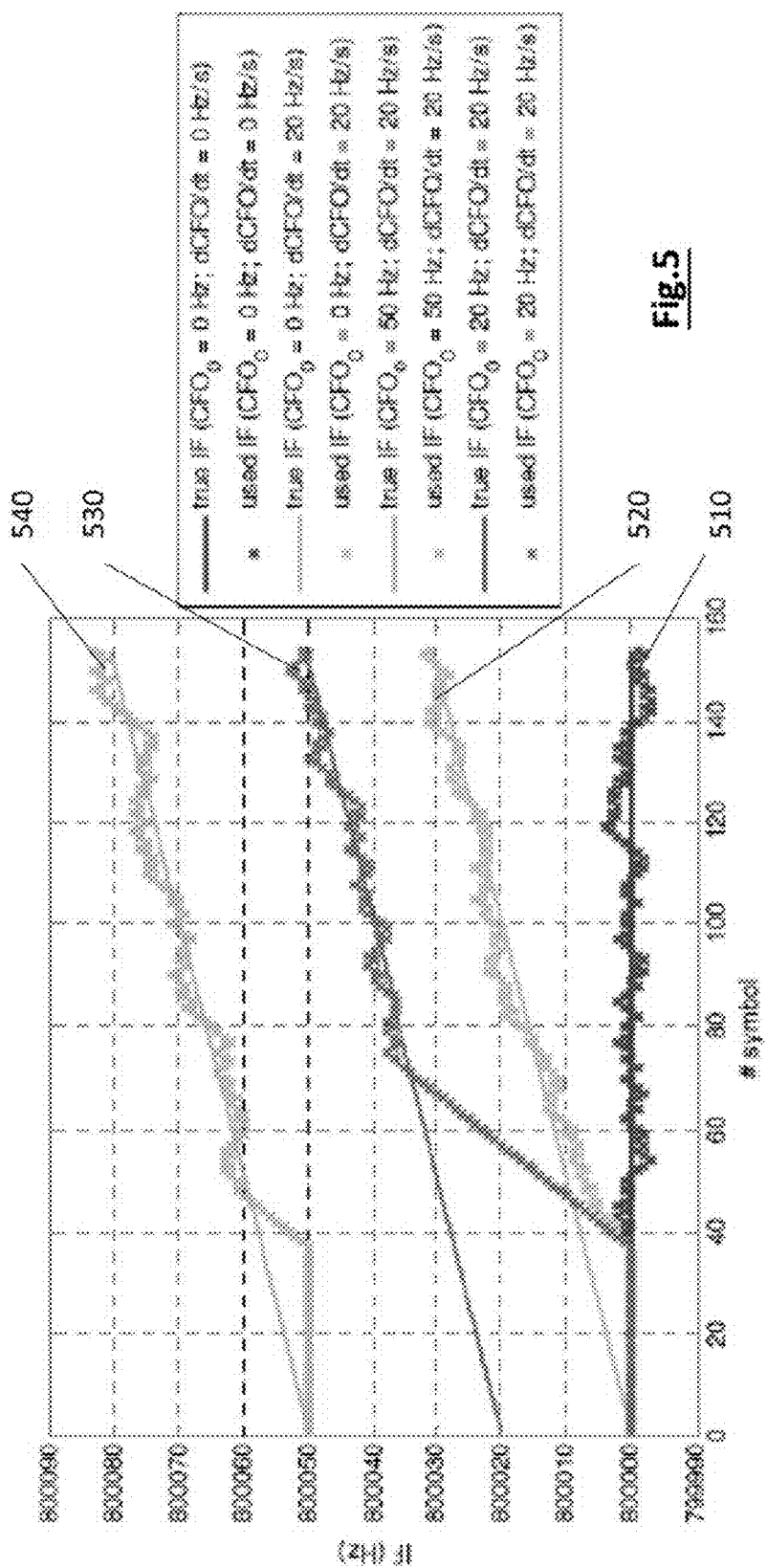
FIG. 5 illustrates frequency tracking of the RF receiver during a frame for different examples of frequency drift.

FIG. 5 illustrates frequency tracking of the RF receiver during a frame for different examples of frequency drift;

Example 510 corresponds to a zero frequency offset at the beginning of the packet and zero drift during the packet.

Example 520 corresponds to a zero frequency offset at the beginning of the packet and 20 Hz/s drift during the packet.

Example 530 corresponds to a 20 Hz/s frequency offset at the beginning of the packet and 20 Hz/s drift during the packet.

Example 540 corresponds to a 50 Hz/s frequency offset at the beginning of the packet and 20 Hz/s drift during the packet.

It can be seen that the intermediate frequency controlling the digital mixer (CORDIC) starts to follow the frequency drift after the end of the synchronisation period (40 symbols). The frequency correction by means of the CORDIC is not active during the synchronisation period.

It can be seen in examples 510-530, that the matched filter centred on 0 Hz is selected, the drift being caught up by the digital mixer later when the initial offset is larger (see 530 compared with 520).

In example 540, the matched filter centred on +50 Hz is selected. Once again, the intermediate frequency starts to follow the frequency drift at the end of the synchronisation phase.

Figure 6:
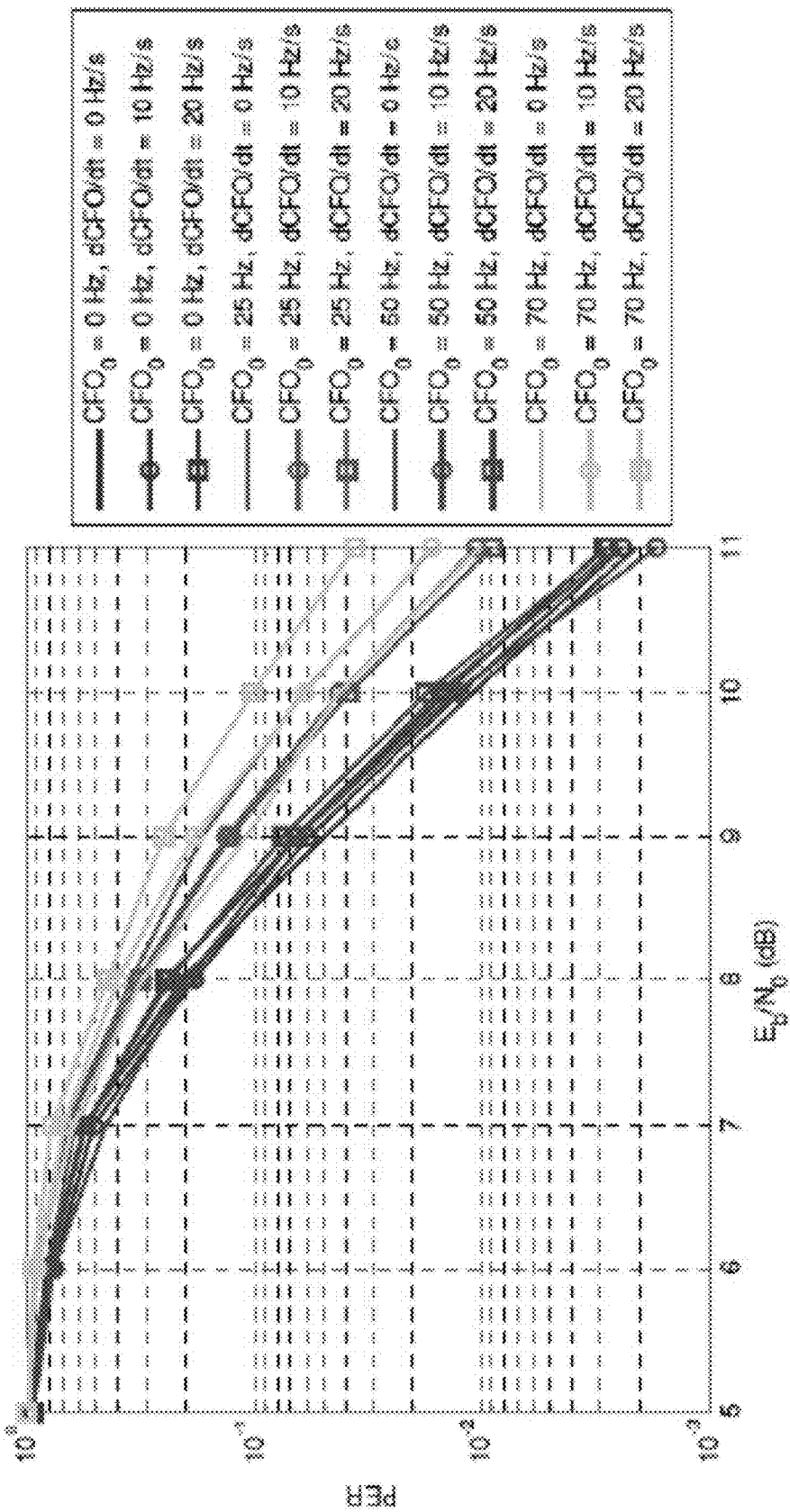
FIG. 6 represents the packet error rate obtained at the output from the receiver in FIG. 1, as a function of the signal to noise ratio for different frequency drift examples.

FIG. 6 represents the performances of the receiver in FIG. 1 in terms of the PER (Packet Error Rate) as a function of the signal to noise ratio, for different examples of frequency drift.

It will be seen that the Packet Error Rate (PER) remains less than 10% when the signal to noise ratio is more than 10 dB, even in the case of a large frequency drift.

The invention claimed is:

1. A frequency drift tracking receiver designed to receive packets of symbols modulating an RF signal, said receiver comprising an RF stage to translate the RF signal received at an intermediate frequency with a quadrature mixer and to digitise the signal thus obtained, said frequency drift tracking receiver comprising:
a digital mixer using a Coordinate Rotation Digital Computer (CORDIC) to bring the frequency translated signal thus digitised into a base band, the CORDIC making a phase rotation of each sample as a function of an estimate of the intermediate frequency; and
a base band digital processing module, implemented by circuitry, designed to be synchronised with packets of symbols and to estimate data transmitted in said packets, and to determine a sign of a variation in frequency drift for each symbol from the data thus estimated, the intermediate frequency being estimated by integration of corrections of elementary frequency steps by a predetermined value modified by the signs thus determined.

2. The frequency drift tracking receiver according to claim 1, wherein the base band digital processing module comprises at least three filters matched to a shape of a pulse that was used to modulate the RF signal, a first matched filter being centred on a zero frequency, a second matched filter being offset relative to the first matched filter by a positive predetermined frequency difference and a third matched filter being offset relative to the first matched filter by a negative predetermined frequency difference, output signals from the three matched filters being input firstly to a switch and to a synchronisation module, implemented by the circuitry, controlling said switch to select a matched filter output signal.

3. The frequency drift tracking receiver according to claim 2, wherein each symbol packet comprises a synchronisation preamble, a predetermined frame delimiter and a data frame, the synchronisation module searches for a frame delimiter in matched filter output signals and selects the output signal in which the frame delimiter was found.

4. The frequency drift tracking receiver according to claim 3, wherein the selected matched filter output signal is then resampled by a decimator, which is implemented by the circuitry and controlled by the synchronisation module, the decimator providing samples at a symbol frequency.

5. The frequency drift tracking receiver according to claim 4, wherein the synchronisation module determines a highest amplitude sample in at least one sequence of samples corresponding to the pulse, and controls the decimator so as to select this sample for each symbol.

6. The frequency drift tracking receiver according to claim 5, wherein data were modulated by a Differential Binary Phase Shift Keying (DBPSK) modulation, each sample at a decimator output is multiplied with a conjugate of the previous sample by a DBPSK demodulator to provide symbols of a Binary Phase Shift Keying (BPSK) modulation constellation.

7. The frequency drift tracking receiver according to claim 6, wherein BPSK symbols at the output from the demodulator are multiplied in an angular correction module, which is implemented by the circuitry, by a conjugate of a magnitude characteristic of a rotation of the BPSK modulation constellation to output corrected symbols.

8. The frequency drift tracking receiver according to claim 7, wherein an estimator, implemented by the circuitry, makes a hard estimate on the corrected symbols to estimate data.

9. The frequency drift tracking receiver according to claim 8, wherein the estimator estimates data by determining a sign of a real part of the corrected symbols.

10. The frequency drift tracking receiver according to claim 9, wherein the characteristic magnitude is filtered by a low pass filter before being input to said angular correction module.

11. The frequency drift tracking receiver according to claim 10, further comprising a second switch, connected to the synchronisation module and to an angular rotation estimating module that outputs symbols forming the frame delimiter during a synchronisation phase and said filtered characteristic magnitude during reception of the data frame, to the angular correction module.

12. The frequency drift tracking receiver according to claim 8, wherein an angular rotation estimating module, implemented by the circuitry, multiplies BPSK symbols at the output from the DBPSK demodulator with symbols characteristic of estimated data to supply the magnitude characteristic of the rotation of the BPSK constellation between two consecutive symbols.

13. The frequency drift tracking receiver according to claim 12, further comprising a module, implemented by the circuitry, determining a direction of variation of the frequency drift starting from a sign of an imaginary part of said magnitude characteristic.

14. The frequency drift tracking receiver according to claim 2, wherein the synchronisation module detects a frame delimiter in several output signals, and selects a highest power output signal amongst these output signals.

15. The frequency drift tracking receiver according to claim 1, wherein a frequency pitch is less than in which is a symbol period.

* * * * *